United States Patent [19]

Ogden

[11] 4,317,852

[45] Mar. 2, 1982

[54] LABEL ASSEMBLY WITH LABEL END FINGER HOLD ARRANGEMENT

[76] Inventor: Ralph Ogden, 1304 Fisher St., Munster, Ind. 46321

[21] Appl. No.: 170,825

[22] Filed: Jul. 21, 1980

[51] Int. Cl.[3] .......................... D21H 1/04; B32B 33/00

[52] U.S. Cl. ........................................ 428/40; 428/41; 428/42; 116/200; 206/460; 206/820; 156/240; 40/2 R

[58] Field of Search ................ 428/40, 41, 42; 283/18

[56] References Cited

U.S. PATENT DOCUMENTS

| | | | |
|---|---|---|---|
| 2,797,801 | 7/1957 | Bishop, Jr. | 428/41 X |
| 3,226,862 | 1/1966 | Gabrun | 428/42 |
| 3,411,978 | 11/1968 | Frohbach et al. | 428/42 |

*Primary Examiner*—Patricia C. Ives
*Attorney, Agent, or Firm*—McWilliams, Mann & Zummer

[57] ABSTRACT

A label assembly arrangement with label end finger hold capability for the individual labels, in which the label assembly comprises a carrier sheet and a plurality of pressure sensitive adhesive backed labels that are shaped to be expeditiously separated from the carrier sheet and centered on the desired substrate surface by finger gripping of the label end portions, which in accordance with the invention have the adhesive side of same masked at either end of the label to protect the adhesive during handling. The masking is effected by masking sections delineated and severed from the carrier sheet and removed therefrom when the individual labels are peeled from their carrier sheet.

2 Claims, 8 Drawing Figures

FIG-5
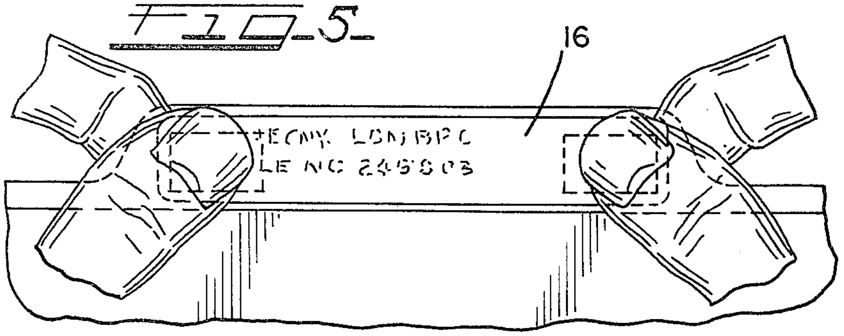
FIG-6
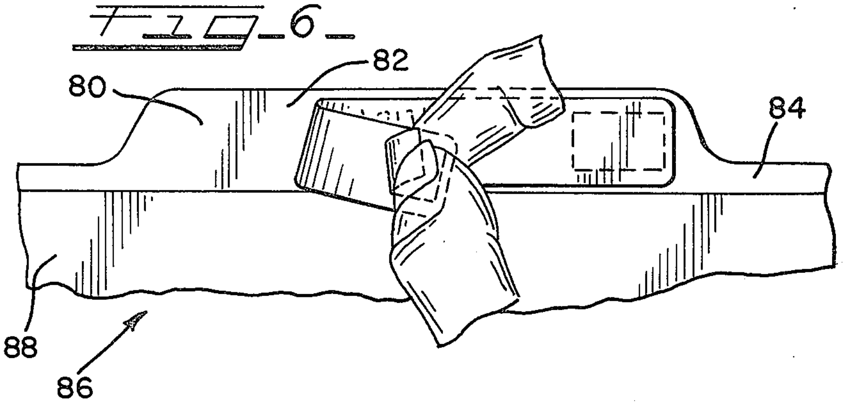
FIG-7
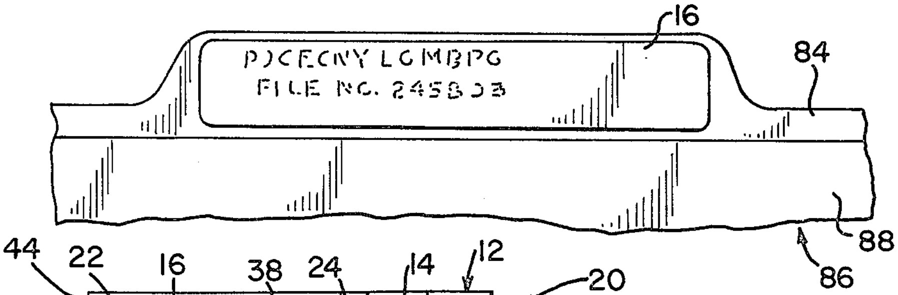
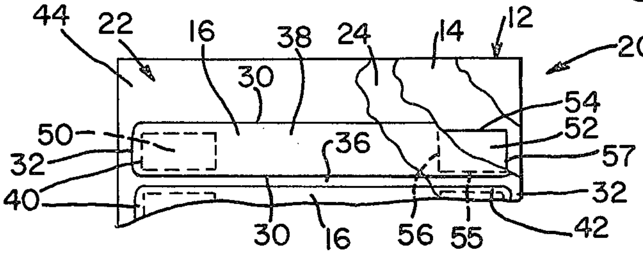
FIG-8

LABEL ASSEMBLY WITH LABEL END FINGER HOLD ARRANGEMENT

This invention relates to a label assembly arrangement, and more particularly to a label assembly involving pressure sensitive adhesive backed labels of the elongate quadrilaterally shaped type that are commonly employed to provide a ready means of applying identification indicia to anything that pressure sensitive adhesive coated labels will adhere to.

Pressure sensitive adhesive coated labels commonly are supplied in label assemblies in which a release agent coated carrier sheet has a plurality of the labels adhered thereto for ready removal therefrom as needed. Typically these labels are of rectangular quadrilateral shaping, and present a blank facing that is coextensive therewith for application thereof of indentification indicia or the like, with the identification indicia being applied by typewriting or handwriting or printing to indentify or provide information about whatever the label is to be applied to. Labels of this type are commonly applied to envelopes, manila files, instrument housings, filing cabinet drawers, and other types of substrates to provide a writing or marking surface on which suitable identification information or the like may be applied, either prior to or after application of the label to the substrate.

Individual labels of this type, when they are to be employed, are moved from their carrier sheet by prying one end or corner of the label free of the carrier sheet, grasping the freed portion of the label, as between one's forefinger and thumb of one hand, and peeling the label from the carrier sheet by pulling the label away from the sheet as needed.

However, the application of labels of this type to the desired substrate surface, be it the surface of a metal file cabinet drawer, an instrument housing (plastic or metal), an envelope, or even a wall surface, is difficult to do with precision, for neat looking placement and spacing, due to the presence of the label exposed adhesive backing, and the impossibility of grasping the label so that its adhesive coating will not be finger contacted, and thus adversely affected, with the user's fingers or thumb, which can also result in the objectionable transfer of some of the adhesive to the user's hand digits involved. This is particularly a problem where one is working in a dusty or dirty environment where, for instance, industrial processing is taking place, since foreign materials where they accumulate on one's hand digits as he works are all too readily transferred to freshly exposed label adhesive of the pressure sensitive type by finger contact therewith, which fouls the adhesive and renders it less if not entirely ineffective in the areas where it has been fouled.

A principal object of the present invention is to provide a label assembly of the general type indicated which permits the individual labels, when they are moved from their carrier, to be readily grasped at either end or both ends, by the user employing finger and thumb holding action on the front and back sides of the label, for quick and accurate placement of the label on the desired substrate surface, without contacting the adhesive to any significant degree, so that the label will adhere to the substrate uniformly along its length when finger pressed in place against the substrate.

Another principal object of the invention is to provide a label assembly arrangement in which the individual labels themselves may be formed using conventional label sheeting stock and label shaping equipment for this purpose, in which the labels and their carrier sheet are shaped and delineated so that the carrier sheet is formed to define for each label an adhesive masking or cover section adjacent each end of the label that separate from the carrier sheet, and remain with the label, on peeling of the label therefrom, and serve as label thumb and finger hold portions for grasping to facilitate initial positioning of the label on the desired substrate, after which they may be removed by peeling therefrom for effecting adhesion of the label to the substrate for the full length of the label.

Other objects of the invention are to provide a label assembly of the pressure sensitive label type in which the individual labels when peeled free of the carrier sheet have their adhesive coatings at the label ends temporarily protected for handling purposes in such a manner that requires no additional structure other than the basic label forming sheet and carrier sheet therefor that are involved in conventional pressure sensitive label arrangements, which label assembly can be mass produced using conventional equipment, and which provides labels that have maximum convenience of application and utility.

In accordance with the invention, the label assembly comprises a release agent coated carrier sheet having initially applied thereto a label sheet of the same size and shape that is formed from a suitable vinyl material or the like, having an appropriate pressure sensitive adhesive coating applied to the back side of same that is suitable for labels formed from this material. The label and carrier sheeting involved is commercially available in roll or sheet form, and assuming that a particular roll or sheet is cut to the desired width in size, the individual sheeting lengths are run through a conventional die cutting machine that severs the label forming sheet to form the individual labels in spaced apart conventional quadrilateral or other desired configuration, and that also severs the backing sheet at the location of each label to define adjacent either end of each label a wholly severed section of the carrier sheet. As part of the processing, the waste portion of the label forming sheet is removed in the lattice form resulting from the severing of the individual labels from the label sheet, leaving adhered to the label carrier sheet the individual labels that conventionally are in spaced apart columnar relation along the length of the carrier sheet and each having a blank facing to which suitable identification indicia may be applied. The carrier sheeting making up the sheeting lengths so processed are also scored thereacross for forming therefrom the individual label assemblies each bearing a predetermined number of labels in a form suitable for distribution and sale.

In using the individual labels of such label assembly, when the user desires to apply a label thereof to a particular substrate surface, he separates one end of one of the labels from its carrier sheet, and grasps it between a finger and thumb to peel the label from its carrier sheet by pulling it lengthwise from the carrier sheet, which action also pulls free of the carrier sheet the adhesive masking sections that have been presevered from the carrier sheet, and which are respectively located adjacent the respective ends of the label. With the label in question free of its carrier sheet, the user may grasp one end of the thus freed label, as by a forefinger and thumb of one hand, and the other end of the label in a similar manner using the other hand, for convenient positioning of the label on the substrate surface, as desired. The user's hand digits engaging the back side of the label will engage the label masking sections at the respective ends of the label, thus preserving the underlying adhesive surfacing involved from the adverse effects of finger or thumb contact therewith. The user may freely manipulate the label to dispose it at exactly the position desired on the substrate surface involved, after which the midportion of the label is pressed against the substrate surface to adhere its adhesive coating underlying the label midportion thereto, and thus fix the position of the label on the substrate. The label ends may then be consecutively swung away from the substrate surface to expose the masking section of each label end and permit the user to individually grip and peel off the respective label masking sections, after which both label ends are burnished by employing finger, thumb, or hand pressure directly from the center portion of the label to the respective ends, against the substrate, for smoothing the label out from its center portion against the substrate surface, to firmly adhere the label to the substrate surface throughout its length including its ends. The label now presents its blank indicia receiving surface for marking as desired, though, of course, the label can be premarked before application to the substrate surface.

Other objects, uses, and advantages will be obvious or become apparent from a consideration of the following detailed description and the application drawings in which like reference numerals indicate like parts throughout the several views.

In the drawings:

FIG. 5 is a view similar to that of FIG. 3, but illustrating the removed label in the course of being applied to the tab portion of a manila or vertical folder;

FIG. 6 is similar to that of FIG. 5, but illustrates the procedure of removing the label adhesive coating masking sections in accordance with the invention;

FIG. 7 is a view similar to that of FIGS. 5 and 6, but illustrating the label as fully applied to the vertical file tab portion; and FIG. 8 is a fragmental plan view of a composite label blank sheeting of a type suitable for practice of the invention, with parts broken away, and showing the sheeting partially formed by the practice of the invention.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

Figure 1:
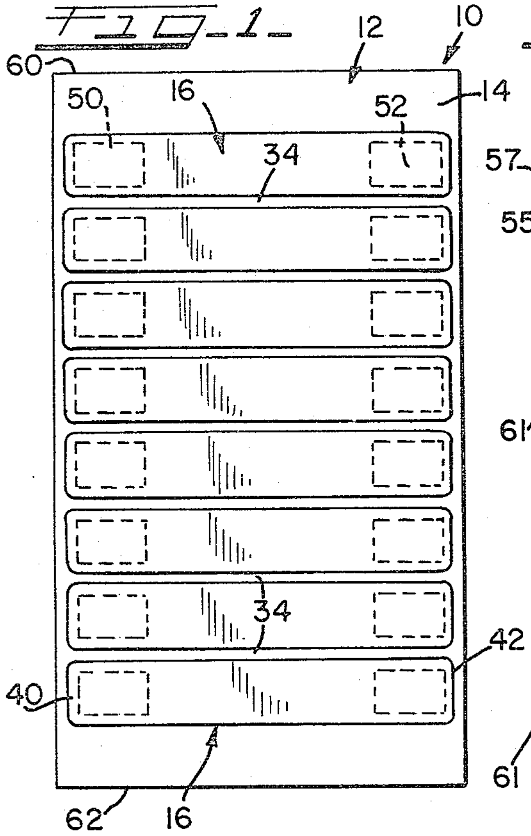
FIG. 1 is a top plan view of a label assembly arranged in accordance with the present invention.
Figure 2:
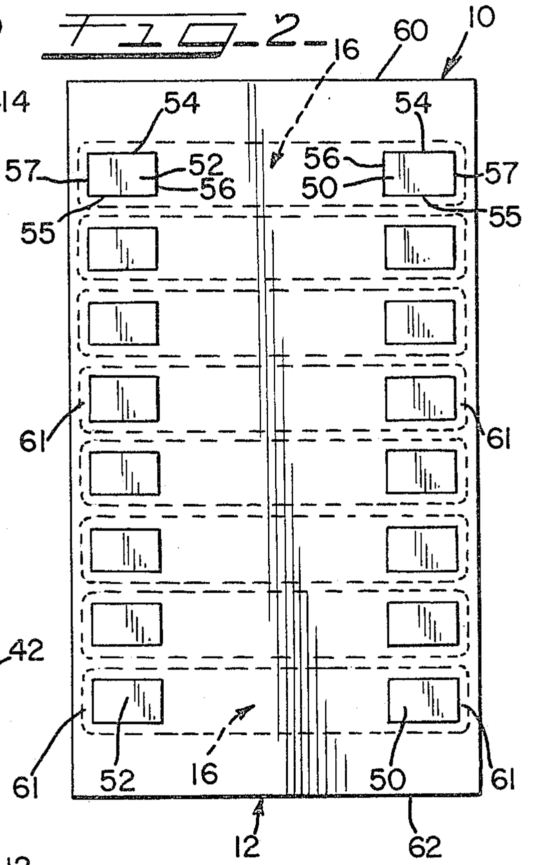
FIG. 2 is a bottom or back plan view of the label assembly shown in FIG. 1, with the individual labels that are applied to the front or top side of the label carrier being indicated in dashed lines.

Reference numeral 10 of FIGS. 1 and 2 generally indicates a label assembly arranged in accordance with the present invention, which comprises a label carrier sheet 12 that is provided with a suitable release agent coating 14 on its front side for releasably receiving the adhesive coated individual labels 16.

The carrier sheet may be any suitable paper based substrate that is coated or impregnated with a suitable release agent, such as silicone or silicone rubber, for releasably receiving the adhesive coated side of the label sheeting from which the labels 16 are formed, as is per se conventional for label assemblies of the type indicated.

The labels 16 are severed using conventional die cut procedures for products of this type, from label sheets that may be formed from, for instance, a suitable vinyl, polyester, or paper based substrate, or other materials commonly employed for making label substrates, which have the back side of same suitably coated with a suitable pressure sensitive adhesive that is normally tacky, but which adheres by pressure alone, and is more cohesive than ordinary adhesive, many types of which are well known in the art. Suitable pressure sensitive adhesives include a rubbery polymeric material compound with suitable compatible resinous tackifiers and dispersed in an appropriate solvent. Other ingredients, such as antioxidants, light stabilizers, color pigments, softening agents, curing agents, stiffening agents, fillers, etc. may be included in the pressure sensitive adhesive to impart or modify particular properties. Particularly useful rubbery polymeric materials include natural rubber, synthetic rubber, latex crepe rubber, rubbery synthetic polymers and copolymers, acrylics, and the like. Commonly used tackifiers include rosin esters such as ester gum, wood rosin, various types of resins, and the like. Aliphatic or aromatic hydrocarbon solvents are most often used with such adhesives. The adhesive layer is firmly bonded to the vinyl or the like substrate, as is conventional, so that it will not separate from it during normal use of the label.

Materials suitable for forming the label components of label assembly 12 are involved in the pressure sensitive labels made and sold by Fasson Division of Avery International Co., Painesville, Ohio, from which material label components may be selected to form the basic label sheet from which the labels 16 are formed and the carrier sheet 12.

A composite blank sheeting 20 of the type from which the label assembly 10 may be formed is diagrammatically illustrated in FIG. 8, which comprises carrier sheet 12 that has conventionally applied thereto its release agent coating 14, and blank label forming sheet 22 from which the labels 16 are formed, which sheet 22 is provided with pressure sensitive adhesive coating 24 of one of the types suggested above. Various forms and types of sheeting 20 are available commercially, and for a specific application a suitable composite sheeting 20 is available commercially (from, for instance, the source mentioned above) in either sheets or rolls, from which composite label sheeting may be suitably cut to the appropriate width for application as desired, for instance, for forming the label assemblies 10.

For this purpose, a composite label sheeting 20 of the desired width is run through a suitable die cutting machine, such as the Mark Andy 820 System offered by the Mark Andy firm of St. Louis, Mo. The purpose is to sever the label forming sheet 22 and the carrier 12 as will now be described for each label assembly 10 that is formed, and in such a manner that while the individual labels 16 are formed, the assembly 10 will remain assembled until the labels 16 are deliberately removed therefrom by the user of the labels. The length of the composite label sheeting being so treated will also be scored between consecutive label assemblies 10 so that they may be separated as needed along such score lines.

Figure 3:
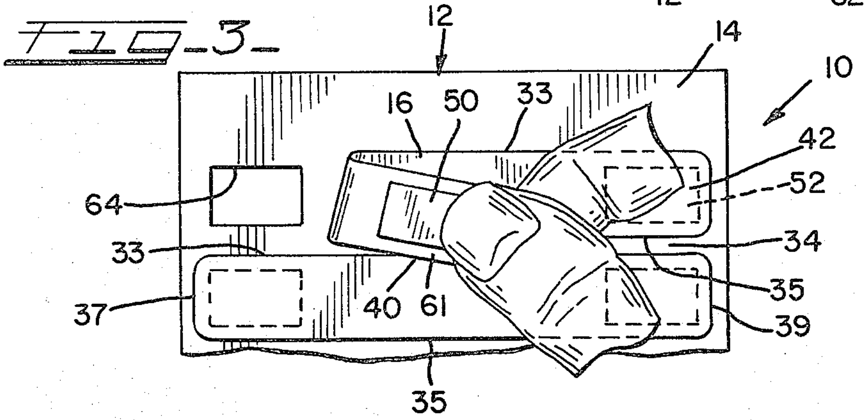
FIG. 3 is a fragmental top plan view of the label assembly shown in FIGS. 1 and 2, but on an enlarged scale, and illustrating one of the labels in the process of being removed from the assembly carrier sheet, in accordance with the practice of the invention, for application to a substrate surface.

During this processing, the label sheet 22 is precut or subdivided to form or define, for each label 16, side severing lines 30 (see FIG. 8) and end severing lines 32, which are joined to be in circumambient or perimeter relation about the area of the label sheet 22 that is to define the sides 33 and 35, and ends 37 and 39, of an individual label 16. As indicated in FIGS. 1-3, the labels 16 are separate and discrete from each other, and thus are separated by a spacing 34, that is represented by the spacing sections 36 of the label sheet 22, with the individual labels 16 thus being of quadrilateral configuration (rectangular in the illustrated embodiment), in columnar spaced apart orientation, with each label 16 being proportioned to have a blank facing 38 and opposed end portions 40 and 42. The labels 16 are thus of a length that is somewhat less than the width of the carrier sheet 12. As indicated, the labels 16 are fully severed from the sheet 22, with the labels 16 and the remaining lattice 44 thus formed in the sheet 22 remaining held together by common adherence to the carrier sheet 12, until the lattice 44 is removed as a conventional part of the operation of the aforementioned machine, to provide a label assembly front side surfacing arrangement that is fully indicated in FIG. 1.

In addition, the carrier sheet 12 is precut during the formation of the label assembly 10 to form a pair of label masking sections 50 and 52 for each label 16. The masking sections 50 and 52 are of the same size and configuration, with the configuration being quadrilateral (rectangular in the illustrated embodiment), but the sections 50 and 52 have a width dimension that is less than the width dimension of the individual labels 16, as clearly indicated in the drawings. For each label 16, the masking sections 50 and 52 are defined by severing side lines 54 and 55 and severing end lines 56 and 57, which for each section 52 and 50 are joined together to be continuous about the respective sections 50 and 52 in perimeter relation thereto so that the sections 50 and 52 are fully separated from carrier sheet 12.

For each label 16, the individual masking sections 50 and 52 are located to be centered with respect to the widths of the labels 16 involved, to be disposed in underlying relation to the respective end portions 40 and 42 of the respective labels, and be spaced somewhat inwardly of the ends 37 and 39, as indicated in the drawings. However, in accordance with the invention, the masking sections 50 and 52 remain a part of the label assembly 10 in its finalized form. Thus, the masking sections 50 and 52 as finalized leave a border portion 61 about the respective end portions 40 and 42 that are free of masking sections 50 and 52 but remain adhered to carrier sheet 12.

The label assembly 10, of course, can be of any desired length and width, and provide a corresponding number of labels 16 as desired, though it is contemplated that in normal use, label assemblies 10 having the general configuration illustrated in the drawings will be supplied proportioned to have a selection of labels that may be from several to a dozen or more, as desired, depending on the size and application intended for the label. The label assemblies 10, following conventional procedures of precutting label sheeting 20, and removing the lattice 44, as by employing the aforementioned Mark Andy 820 System, are formed in the indicated multiple unit consecutively connected manner on an elongate strip of label material comprising commercially available labeling sheeting 20, cut down to appropriate width size for processing in accordance with the invention. The score lines (not shown) for separating individual label assemblies 10 are formed along the upper and lower edges 60 and 62 of the respective assemblies 10, and correspond thereto.

In using the label assemblies 10, the individual labels 16 are removed therefrom and handled in the manner indicated in FIGS. 3-6.

This involves the user first preliminarily separating one end portion 40, or the other end portion 42, of a label 16 to be removed from an assembly 10 (in the showing of FIG. 3 this would be the end portion 40 of the top label 16 of assembly 10), and then grasping the separated label end portion between the user's thumb and forefinger of the appropriate hand (the right hand in the showing of FIG. 3), and pulling the label 16 endwise thereof, toward the other end of the label, to peel the label fully from its carrier sheet 12. In the showing of FIG. 3, the label end portion 40 is pulled away from the carrier sheet 12 and moved generally in the direction of its other end 42. This separates the label masking section 50 from carrier sheet 12, to leave rectangular opening 64 in the carrier sheet that represents the space the masking section 50 formerly occupied when the first label 16 in question was fully adhered to the carrier sheet 12. Complete removal of the label 16 from the carrier sheet also separates the second label masking section 52 from the carrier sheet to define a similar aperture opening 64 therein at that side of the carrier sheet 12.

Figure 4:
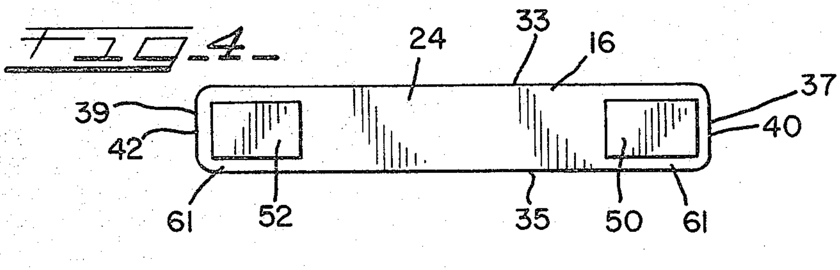
FIG. 4 is a bottom or back plan view of one of the individual labels after having been removed from its carrier sheet.

FIG. 4 is a plan view of the label 16 as separated from its carrier sheet 12, taken from its back side, showing the label 16, its adhesive coating 24, and the masking sections 50 and 52 that overlie the adhesive coating 24 at the respective ends 40 and 42 of the label, but in spaced relation from the sides 33 and 35 of the label and the terminal ends 37 and 39 thereof, to define the now exposed borders 61 that are free of carrier sheet 12.

Of course, the label 16 may be removed from the assembly 10 by first separating the end 42 thereof from the carrier sheet 12 and pulling the label end 42 across the width of the carrier sheet 12 toward the other label end 40, thus reversing the removal procedure suggested by FIG. 3.

Assuming that a label 16 is fully removed as indicated in FIG. 4, the removed label 16 is grasped as indicated in FIG. 5, that is with one end portion 40 of same grasped between the thumb and forefinger of the user's left hand, and the other end portion 42 of same grasped between the thumb and forefinger of the user's right hand, and then the label 16 in question is positioned for proper alignment of the label 16 itself to the substrate surface to which it is to be applied. In the showing of FIGS. 5-7, the selected substrate surface 80 is defined by tab portion 82 of the larger side 84 of a conventional manila vertical file folder 86 that also defines the shorter front side 88 of same.

In any event, it will be apparent that the label 16 as held by the user of the label involves the user's forefingers engaging the back side of the label in the area of the masking sections 50 and 52, which avoids the user's forefingers from coming into contact with any significant amount of the adhesive coating 24 thereof. Using care, the user's forefingers can be so placed to engage only the masking sections 50 and 52, respectively. In any event, the label user disposes the label 16 in centered relation with the substrate surface 80 and in parallel relation thereto, and then places the back side of the label 16 in engagement therewith, the user then pressing the label ends 40 and 42 thereagainst to obtain preliminary adherance of the label to the substrate surface at the borders 61 of the label ends about the respective masking sections 50 and 52, with the user slipping his forefingers out from underneath the label ends to effect this preliminary adherence. The user may then use a thumb or a forefinger to burnish or rub the midportion of the label 16 into firm adherence with the substrate which fixes the position of the label 16 on its surface 80.

The masking sections 50 and 52 are then removed, and this may be effected as suggested by FIG. 6, wherein the label end portion 40 is pulled free of the substrate surface and doubled over to expose its masking section 50, which is then separated from the label adhesive coating 24 at one edge of same and peeled free of the label; the label end portion 40 is then smoothed down against the substrate surface 80 by sliding one's finger or thumb from the midportion of the label across the top of label end portion 40. The label end portion 42 is handled in a similar manner to pull same free of the substrate surface 80, peel off the section 52, and then finger burnish label end portion 42 firmly and flatly against the surface 80 to complete final adherence of the label 16 to the substrate surface 80 with the positioning shown in FIG. 7.

The label 16 as applied to the surface 80 may then be appropriately marked in a suitable manner to provide the identification indicia desired, as indicated in FIG. 7. Alternately, the label 16 may have its identification indicia applied to same while the label 16 remains adhered to the label assembly 10, by applying the assembly 10 as a whole to a typewriter or the like and typing the desired information indicia on the label blank surfacing 38. If desired, all the labels of the label assembly 10 may be individually and consecutively marked while the labels remain part of the label assembly, which as a whole may be handled much more conveniently for typing purposes than attempting to type the individual labels separately.

It will thus be seen that the invention provides a label assembly in which individual labels are made available for use for application to desired substrate surfaces, which in addition to manila files may take the form of plastic or metallic instrument housings, file cabinet drawers, control panel legends, or any application where pressure sensitive adhesive backed labels find application. Since the user may readily grasp both ends of the label without having to be concerned about finger engagement with the label adhesive surface, the label may be easily and accurately positioned as needed and then fully adhered thereto by following the masking section removal procedures outlined above. During this handling of the label, adequate areas of the label adhesive coating at its ends are exposed for preliminary adherence purposes while the major areas of the adhesive at the label ends remain protected from finger contact and possible fouling or other adverse affect on the adhesive. Finger burnishing of the label at its midportion effects final positioning of the label in its adhered relation to the substrate surface involved, and the end portions of same are smoothed out into flat adherence with the substrate surface consecutively thereafter by following the masking section removal procedures described.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a label assembly including a carrier sheet having a release agent coating on one side of same and a plurality of pressure sensitive adhesive backed labels removably adhered to said carrier sheet coating, the improvement wherein:

said labels are of substantially rectangular configuration disposed in parallel, uniformly spaced apart, superposed, columnar relation on said coating, with said labels each having a blank facing on the front side of same for receiving typewriter applied identification indicia, which facing is bounded by a perimeter forming circumambient marginal edging, said facings of said labels being of substantially equal areas and substantially similar configuration, said carrier sheet being of quadrilateral perimeter configuration and said labels being of substantially the same length dimension and being disposed on said carrier sheet such that said length dimensions thereof extend transversely of said carrier sheet, with each of said labels having a first terminal end portion at one end of same and a second terminal end portion at the other end of same, said one ends of said labels being columnarly aligned across said one side of said carrier sheet and said other ends of said labels being columnarly aligned across said one side of said carrier sheet, said carrier sheet being severed at the portions thereof underlying the respective ends of each of said labels to define from said carrier sheet a quadrilateral masking section paralleling said labels having a marginal edging defining the perimeter of same, with the masking section at each label end being fully severed from said carrier sheet, and the masking sections of each label being adhered to the adhesive of the label thereof, and being spaced apart across the length of the label thereof whereby said masking sections of each label extend short of the midportion of the label, with the masking sections of each label being of less width dimension than the label thereof and being substantially centered on the label respective ends and lying within the label marginal edging whereby said labels at each end thereof have their backings adhered to said carrier sheet release agent coating about the marginal edgings of the masking sections thereof, said assembly being adapted for application to a typewriter as a whole for application of typewriter applied identification indicia to said label facings, said labels each being manually removable from said carrier sheet and adhered to a substrate surface that is to receive the label by:

separating one of the label ends from the carrier sheet and drawing it outwardly of the carrier sheet to bring with it the label masking sections from the carrier sheet and fully separate the label and its said masking sections from the carrier sheet, with the user then finger holding each label end and its underlying masking section, applying the label to the substrate surface that is to receive the label by pressing the label ends against the substrate surface, to obtain preliminary adherance of the label to the substrate surface about said marginal edgings of said masking sections of such label, and finger pressing the midportion of the label adhesive backing into adherance with the substrate surface, then freeing said label ends from the substrate surface and separating the label masking sections from either end of same, and finger pressing the remainder of the label into full adherance with the substrate surface.

2. The improvement set forth in claim 2 wherein:

said label ends extend short of the perimeter of said carrier sheet.

* * * * *